United States Patent
Desikachari et al.

(10) Patent No.: US 12,174,722 B2
(45) Date of Patent: Dec. 24, 2024

(54) CHARACTERIZING OPERATION OF SOFTWARE APPLICATIONS HAVING LARGE NUMBER OF COMPONENTS

(71) Applicant: APPNOMIC SYSTEMS PRIVATE LIMITED, Bengaluru (IN)

(72) Inventors: Padmanabhan Desikachari, Bangalore (IN); Pranav Kumar Jha, Bangalore (IN)

(73) Assignee: APPNOMIC SYSTEMS PRIVATE LIMITED, Karnataka (IN)

( * ) Notice: Subject to any disclaimer, the term of this patent is extended or adjusted under 35 U.S.C. 154(b) by 899 days.

(21) Appl. No.: 17/013,876

(22) Filed: Sep. 8, 2020

(65) Prior Publication Data

US 2021/0224102 A1 Jul. 22, 2021

(30) Foreign Application Priority Data

Jan. 17, 2020 (IN) .............................. 202041002084

(51) Int. Cl.
| | | |
|---|---|---|
| *G06F 11/34* | (2006.01) | |
| *G06F 9/30* | (2018.01) | |
| *G06F 9/46* | (2006.01) | |
| *G06F 9/54* | (2006.01) | |
| *G06F 18/23* | (2023.01) | |
| *G06N 20/00* | (2019.01) | |

(52) U.S. Cl.
CPC .......... *G06F 11/3409* (2013.01); *G06F 9/463* (2013.01); *G06F 9/541* (2013.01); *G06F 11/3452* (2013.01); *G06F 18/23* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,075,984 | B1 * | 7/2021 | Mercier | .................. H04L 43/20 |
| 2002/0095434 | A1 * | 7/2002 | Lane | .................. G06F 11/3466 |
| | | | | 714/E11.2 |
| 2016/0378615 | A1 * | 12/2016 | Cohen | ..................... G06F 11/00 |
| | | | | 714/19 |
| 2021/0089969 | A1 * | 3/2021 | Sengupta | ............ G06F 3/04817 |

* cited by examiner

*Primary Examiner* — Bradley A Teets
*Assistant Examiner* — Melissa A Headly
(74) *Attorney, Agent, or Firm* — IPHORIZONS PLLC; Narendra Reddy Thappeta

(57) ABSTRACT

An aspect of the present disclosure facilitates characterizing operation of software applications having large number of components. In one embodiment, a digital processing system receives a first data indicating invocation types and corresponding invocation counts at an entry component for multiple block durations, where the entry component causes execution of internal component of the software application. The system also receives a second data indicating values for a processing metric at the internal components for the same block durations. The system then constructs for each internal component, a corresponding component model correlating the values for the processing metrics at the internal component indicated in the second data to the invocation types and invocation counts of the entry component indicated in the first data. The component models can aid in the performance management of the software application.

17 Claims, 14 Drawing Sheets

| Component A Inflow | | | |
|---|---|---|---|
| Time | A1_Inbound | A2_Inbound | A3_Inbound |
| 1/21/2020 0:00 | 9 | 25 | 19 |
| 1/21/2020 0:01 | 10 | 32 | 9 |
| 1/21/2020 0:02 | 11 | 35 | 18 |
| 1/21/2020 0:03 | 14 | 31 | 10 |
| 1/21/2020 0:04 | 14 | 44 | 11 |
| 1/21/2020 0:05 | 15 | 26 | 9 |
| 1/21/2020 0:06 | 15 | 37 | 12 |
| 1/21/2020 0:07 | 11 | 35 | 5 |
| 1/21/2020 0:08 | 10 | 40 | 34 |
| 1/21/2020 0:09 | 9 | 29 | 1579 |
| 1/21/2020 0:10 | 8 | 44 | 2017 |
| 1/21/2020 0:11 | 11 | 25 | 2573 |
| 1/21/2020 0:12 | 8 | 40 | 677 |
| 1/21/2020 0:13 | 7 | 38 | 265 |
| 1/21/2020 0:14 | 7 | 31 | 14 |
| 1/21/2020 0:15 | 5 | 35 | 21 |
| 1/21/2020 0:16 | 7 | 29 | 5 |
| 1/21/2020 0:17 | 8 | 50 | 8 |
| 1/21/2020 0:18 | 29 | 34 | 8 |
| 1/21/2020 0:19 | 5 | 41 | 11 |
| 1/21/2020 0:20 | 4 | 28 | 180 |

| Component B Inflow | | |
|---|---|---|
| Time | B1_Inbound | B2_Inbound |
| 1/21/2020 0:00 | 6 | 4 |
| 1/21/2020 0:01 | 29 | 7 |
| 1/21/2020 0:02 | 34 | 12 |
| 1/21/2020 0:03 | 37 | 22 |
| 1/21/2020 0:04 | 19 | 9 |
| 1/21/2020 0:05 | 23 | 2 |
| 1/21/2020 0:06 | 18 | 4 |
| 1/21/2020 0:07 | 14 | 5 |
| 1/21/2020 0:08 | 26 | 8 |
| 1/21/2020 0:09 | 111 | 12 |
| 1/21/2020 0:10 | 179 | 7 |
| 1/21/2020 0:11 | 212 | 8 |
| 1/21/2020 0:12 | 54 | 16 |
| 1/21/2020 0:13 | 23 | 14 |
| 1/21/2020 0:14 | 19 | 15 |
| 1/21/2020 0:15 | 26 | 19 |
| 1/21/2020 0:16 | 16 | 11 |
| 1/21/2020 0:17 | 17 | 4 |
| 1/21/2020 0:18 | 22 | 3 |
| 1/21/2020 0:19 | 11 | 2 |
| 1/21/2020 0:20 | 17 | 5 |

725 ⭢

| Component C Inflow | |
|---|---|
| Time | C1_Inbound |
| 1/21/2020 0:00 | 1 |
| 1/21/2020 0:01 | 3 |
| 1/21/2020 0:02 | 3 |
| 1/21/2020 0:03 | 4 |
| 1/21/2020 0:04 | 2 |
| 1/21/2020 0:05 | 2 |
| 1/21/2020 0:06 | 2 |
| 1/21/2020 0:07 | 1 |
| 1/21/2020 0:08 | 3 |
| 1/21/2020 0:09 | 11 |
| 1/21/2020 0:10 | 18 |
| 1/21/2020 0:11 | 21 |
| 1/21/2020 0:12 | 5 |
| 1/21/2020 0:13 | 2 |
| 1/21/2020 0:14 | 2 |
| 1/21/2020 0:15 | 3 |
| 1/21/2020 0:16 | 2 |
| 1/21/2020 0:17 | 2 |
| 1/21/2020 0:18 | 2 |
| 1/21/2020 0:19 | 1 |
| 1/21/2020 0:20 | 2 |

728 ⭢

| Component D Inflow | | |
|---|---|---|
| Time | D1_Inbound | D2_Inbound |
| 1/21/2020 0:00 | 9 | 47 |
| 1/21/2020 0:01 | 6 | 88 |
| 1/21/2020 0:02 | 9 | 4 |
| 1/21/2020 0:03 | 6 | 39 |
| 1/21/2020 0:04 | 6 | 74 |
| 1/21/2020 0:05 | 6 | 5 |
| 1/21/2020 0:06 | 7 | 72 |
| 1/21/2020 0:07 | 4 | 38 |
| 1/21/2020 0:08 | 14 | 51 |
| 1/21/2020 0:09 | 529 | 6 |
| 1/21/2020 0:10 | 675 | 31 |
| 1/21/2020 0:11 | 860 | 64 |
| 1/21/2020 0:12 | 228 | 11 |
| 1/21/2020 0:13 | 91 | 22 |
| 1/21/2020 0:14 | 7 | 18 |
| 1/21/2020 0:15 | 10 | 23 |
| 1/21/2020 0:16 | 8 | 22 |
| 1/21/2020 0:17 | 5 | 9 |
| 1/21/2020 0:18 | 5 | 43 |
| 1/21/2020 0:19 | 6 | 60 |
| 1/21/2020 0:20 | 63 | 7 |

*FIG. 7B*

| Signature ID | A1_Inbound | A2_Inbound | A3_Inbound |
|---|---|---|---|
| S1 | 15 | 37 | 12 |
| S2 | 9 | 29 | 1579 |
| S3 | 8 | 44 | 2017 |
| S4 | 8 | 40 | 677 |
| S5 | 7 | 38 | 265 |

| Invoking | Invoked | Invocation ID |
|---|---|---|
| A | B | B1_Inbound |
| A | C | C1_Inbound |
| A | D | D1_Inbound |
| B | E | E2_Inbound |
| B | F | F1_Inbound |
| D | G | G3_Inbound |
| D | H | H2_Inbound |

Component B Performance

| Time | A1_Inbound | A2_Inbound | A3_Inbound | Signature | B1_Inbound | B1_Upper | B1_Lower | Is Anomalous |
|---|---|---|---|---|---|---|---|---|
| 1/21/2020 0:21 | 2 | 34 | 17 | S1 | 23 | 26 | 13 | |
| 1/21/2020 0:22 | 6 | 40 | 1 | S1 | 20 | 26 | 13 | |
| 1/21/2020 0:23 | 8 | 43 | 4 | S1 | 10 | 26 | 13 | |
| 1/21/2020 0:24 | 1 | 38 | 34 | S5 | 27 | 26 | 13 | |
| 1/21/2020 0:25 | 2 | 30 | 421 | S5 | 119 | 124 | 99 | |
| 1/21/2020 0:26 | 1 | 32 | 600 | S4 | 183 | 202 | 151 | |
| 1/21/2020 0:27 | 47 | 89 | 1542 | S2 | 229 | 238 | 180 | |
| 1/21/2020 0:28 | 42 | 98 | 1786 | S3 | 17 | 255 | 210 | 1 |
| 1/21/2020 0:29 | 15 | 113 | 1479 | S2 | 21 | 238 | 180 | 1 |
| 1/21/2020 0:30 | 4 | 145 | 550 | S4 | 14 | 202 | 151 | 1 |
| 1/21/2020 0:31 | 7 | 27 | 20 | S1 | 18 | 26 | 13 | |
| 1/21/2020 0:32 | 7 | 28 | 9 | S1 | 19 | 26 | 13 | |
| 1/21/2020 0:33 | 240 | 9 | 119 | | 84 | | | |
| 1/21/2020 0:34 | 4 | 41 | 15 | S1 | 17 | 26 | 13 | |

*FIG. 7F*

CHARACTERIZING OPERATION OF SOFTWARE APPLICATIONS HAVING LARGE NUMBER OF COMPONENTS

PRIORITY CLAIM

The instant patent application is related to and claims priority from the co-pending India provisional patent application entitled, "PERFORMANCE MANAGEMENT OF SOFTWARE APPLICATIONS DEPLOYED IN COMPUTING INFRASTRUCTURES", Serial No.: 202041002084, Filed: 17 Jan. 2020, which is incorporated in its entirety herewith.

BACKGROUND OF THE DISCLOSURE

Technical Field

The present disclosure relates to distributed software applications and more specifically to characterizing operation of software applications having large number of components.

Related Art

A software application is generally constituted of software instructions which are executed on computing infrastructures. In general, each software application is architected in the form of (software) components, with each component being designed to be invoked by other components by suitable interfaces.

Software applications may contain a large number of (software) components. As used herein, a component is in the form of a software module (containing software instructions), which can be executed independently and invoked for providing a specific functionality.

For example, in serverless computing, applications often contain potentially thousands of 'compute functions' deployed in a distributed manner on potentially hundreds of nodes of a cloud infrastructure, as is well known in the relevant arts.

Operation of a software application implies that the application is in an execution state suitable for processing of user requests. Thus, during operation, the various components are invoked to process the received user requests.

There is a general need to characterize operation of software application, usually for performance management (e.g., ensuring desired throughput levels, identifying bottlenecks/anomalies, resource allocation, workload management, etc.) as is well known in the relevant arts.

BRIEF DESCRIPTION OF THE DRAWINGS

Example embodiments of the present disclosure will be described with reference to the accompanying drawings briefly described below.

FIG. 7A is a workload table depicting the invocation types and corresponding invocation counts of an entry component of a software application in multiple block durations, in one embodiment.

FIG. 7B is metric tables depicting the values of a processing metric captured at internal components of a software application in multiple block durations, in one embodiment.

FIG. 7C is a signature table depicting the work load signatures identified for a software application in one embodiment.

FIG. 7D is a topological table depicting the execution flow for a software application in one embodiment.

FIG. 7F is a run-time table depicting characterizing operation of an internal component (B) of a software application in multiple block durations, in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
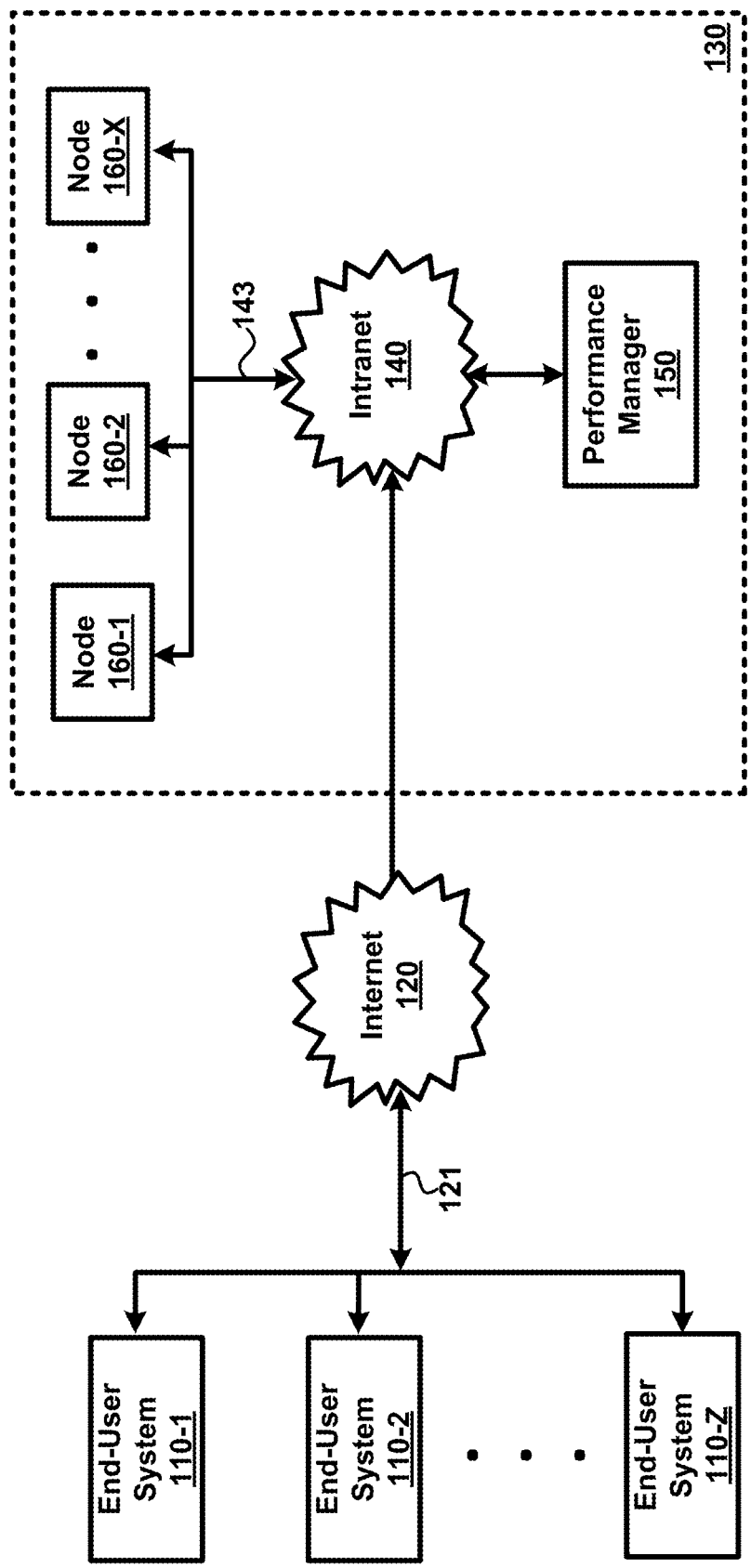
FIG. 1 is a block diagram illustrating an example environment (computing system) in which several aspects of the present invention can be implemented.

An aspect of the present disclosure facilitates characterizing operation of software applications having large number of components. In one embodiment, a digital processing system receives a first data indicating invocation types and corresponding invocation counts at an entry component for multiple block durations, where the entry component causes execution of internal component of the software application. The system also receives a second data indicating values for a processing metric at the internal components for the same block durations. The system then constructs for each internal component, a corresponding component model correlating the values for the processing metrics at the internal component indicated in the second data to the invocation types and invocation counts of the entry component indicated in the first data. The component models can aid in the performance management of the software application.

In one embodiment, the software application is a serverless application that contains components including an API (application program interface) gateway, compute functions, and services, with the entry component being the API gateway that receives user requests and invokes at least some of the other components of said plurality of components to process the user requests. In another embodiment, the software application is an enterprise application that contains components including web portals application services, and data access interfaces, with the entry component being a web portal that receives user requests and invokes at least some of the other components of said plurality of components to process the user requests.

According to another aspect of the present disclosure, the processing metric at each internal component of the internal components (caused to be executed by the entry component) is invocation counts of corresponding invocation types of the internal component.

According to one more aspect of the present disclosure, the digital processing system (noted above) constructs a first component model for a first internal component. Upon identifying a third data indicating a first set of invocation types and corresponding first invocation counts at the entry component in a current block duration, the system predicts based on the first component model and the third data, an acceptable range for the processing metric at the first internal component in the current block duration. The system then checks whether an actual value for the processing metric at the first internal component in the current block duration is within the predicted acceptable range to determine whether the operation of the software application is as expected.

According to yet another aspect of the present disclosure, the digital processing system (noted above) first determines workload signatures based on the first data noted above, each workload signature representing a cluster of block signatures, and each block signature characterizing the invocation types and respective invocation counts in a corresponding block duration. The system then generates the first component model (noted above) correlating the values of the processing metric at the first internal component to the determined workload signatures.

According to an aspect of the present disclosure, each of the component models constructed for the internal components of the software application is a machine learning (ML) model. Thus, the component models capture the behavior of the internal components during processing of different workloads (in corresponding block durations).

According to another aspect of the present disclosure, the digital processing system (noted above) also constructs a second component model for a second internal component and predicts based on said second component model and the third data (noted above), a second acceptable range for a count of a second invocation type of a second internal component in the (above noted) current block duration. The system also receives a topology data indicating an execution flow in the software application, each link of the execution flow specifying an invoking component that invokes an invoked component. A first link specifies that the second internal component invokes the first internal component. Accordingly, if the (above noted) checking determines that the actual value for said processing metric at said first internal component is outside the acceptable range, the system checks whether an actual value of the processing metric at the second internal component in the current block duration is within the second acceptable range in view of the first link to determine whether the operation of the software application is as expected. Accordingly, the root cause earlier in the execution flow may be readily identified.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120, intranet 140 and computing infrastructure 130. Computing infrastructure 130 in turn is shown containing nodes 160-1 through 160-X (X representing any natural number). The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130 are assumed to be connected via intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing a large number of (software) components are deployed in nodes 160 of computing infrastructure 130. Examples of such software include, but are not limited to, data processing (e.g., batch processing, stream processing, extract-transform-load (ETL)) applications, Internet of things (IoT) services, mobile applications, and web applications. The components of a software application may be deployed in an execution state suitable for processing of user requests received from end-user systems 110.

Thus, during (real-time/run-time) operation of a software application, some of the components of the software application are invoked for processing of the received user requests. It may be desirable to characterize the operation of the components and in turn, the operation of the software application. Such characterization may be particularly desirable when the software application has a large number (e.g. 100+) of components deployed across multiple nodes (160) of the computing infrastructure (130).

For example, a developer/owner of a software application may wish to manage the performance of the application deployed in the computing infrastructure 130. The developer/owner may observe that the processing of specific set of user requests takes a considerably long duration (based on a response time for the user requests), and accordingly may desire to determine the specific reason for the long duration. Alternatively, the developer/owner may determine that a newer version of the software application takes more time than an older version to process the same set of user requests, and accordingly may wish to know the specific reason for the increase in time of processing by the newer version.

Performance manager 150, provided according to several aspects of the present disclosure, facilitates characterizing operation of software applications having a large number of components deployed in a computing infrastructure (130). Though shown internal to computing infrastructure 130, in alternative embodiments, performance manager 150 may be implemented external to computing infrastructure 130, for example, as a system connected to Internet 120. The manner in which performance manager 150 facilitates performance management of software applications is described below with examples.

3. Characterizing Operation of Software Applications

Figure 2:
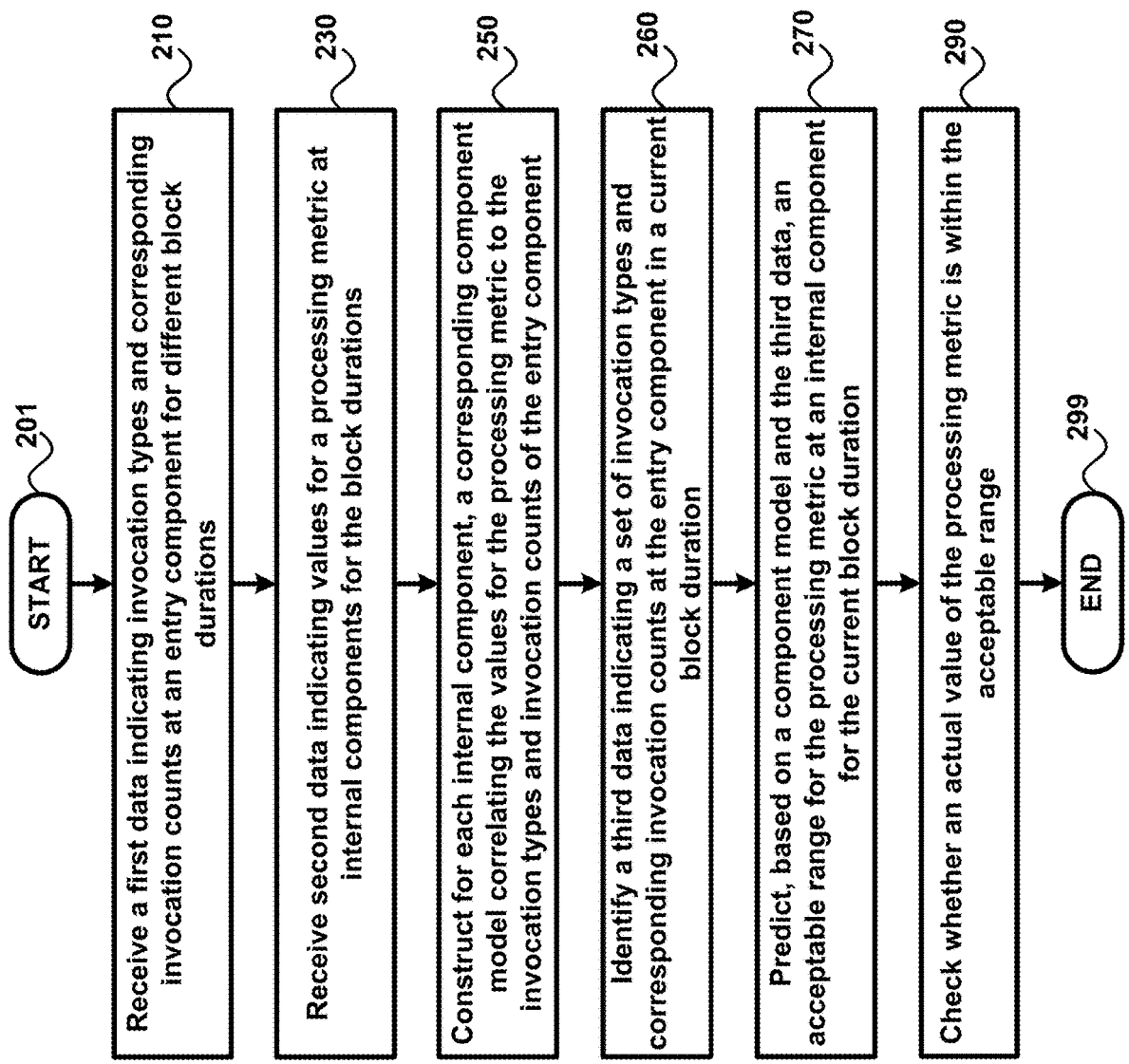
FIG. 2 is a flow chart illustrating the manner in which characterizing operation of software applications having a large number of components is facilitated according to aspects of the present disclosure.

FIG. 2 is a flow chart illustrating the manner in which characterizing operation of software applications having a large number of components is facilitated according to aspects of the present disclosure. The flowchart is described with respect to the systems of FIG. 1, in particular performance manager 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below; as suited to the specific environment, as will be apparent to one skilled in the relevant arts. Many of such implementations are contemplated to be covered by several aspects of the present invention. The flow chart begins in step 201, in which control immediately passes to step 210.

In step 210, performance manager 150) receives a first data indicating invocation types and corresponding invocation counts at an entry component for different block durations (typically, a sequence of block durations). An entry component represents a single component through which all the requests constituting the work load are received for processing by the portion of software application sought to be characterized. Assuming an entire software application is sought to be characterized, the entry component is designed to receive user requests (sent by end-user systems 110) and invoke at least some of the other components of the software application for processing of the received user requests. The entry component causes execution of one or more internal components of the software application for processing of the workload (user requests).

Each invocation type refers to a corresponding unique manner in which a component is invoked and is typically characterized by the names and/or data types of the input and output parameters of the component (commonly referred to as "method signature"), the manner of invocation (e.g. synchronized, asynchronized, one-way/single call, stream/poll-based), etc. Invocation count refers to the number of times the same combination of names and/or data types (but with different data values) and manner of invocation is repeated.

In the description below; the block duration is assumed to be a minute, with measurements performed in smaller units (sub-block) of a second. Alternative embodiments can be employed with different durations for blocks and sub-blocks, as will be apparent to a skilled practitioner based on the disclosure provided herein.

In step 230, performance manager 150 receives a second data indicating values for a processing metric at the internal components for the (same sequence of) block durations. An internal component may be invoked directly by the entry component or by another internal component (which in turn was invoked by the entry component). The internal component upon execution may invoke other (one or more) internal components. According to an aspect, the processing metric is at each internal component is invocation counts of corresponding invocation types of the internal component.

While the embodiments herein are described with respect to invocation types and invocation counts at the internal components, it may be readily appreciated that alternative embodiments can be implemented with other processing metrics at the internal components. A processing metric necessarily characterizes inputs (i.e., when component is invoked such as bytes received, number of times a component has been invoked or inbound invocation rate, etc.), outputs (when the component invokes other components such as bytes sent, number of times a component invokes other components or outbound invocation rates, etc.) and related execution aspects (such as latency time measured as the difference between the time of receipt of a request and the time of sending a response to the request, error rate or failures per period, etc.).

In step 250, performance manager 150 constructs for each internal component, a corresponding component model correlating the values for the processing metrics at the internal component indicated in the second data to the invocation types and invocation counts of the entry component indicated in the first data. The correlation ensures that the component model for an internal component captures the behavior of the internal component (by the metrics information in the second data) during processing of different workloads (user requests) in corresponding block durations. According to an aspect, the component models are machine learning (ML) models constructed according to well-known machine learning techniques noted in the below sections.

It may be appreciated that the constructed component models characterize the operation of the software application when processing user requests received from end-user systems 110. The component models can accordingly aid in the performance management of the software application. One such usage of a single component model of an internal component (of interest) is described in detail below.

In step 260, performance manager 150 identifies a third data indicating a set of invocation types and corresponding invocation counts at the entry component in a current block duration. The current block duration is after the sequence of block durations (noted in step 210) for which the above noted first data and second data is received. It should be noted that the third data represent the current block signature.

In step 270, performance manager 150 predicts, based on a (single) component model and the third data (current block signature), an acceptable range for range for the processing metric at the internal component (of interest) in the current block duration. The acceptable range is a set of values expected for the processing metric. In one embodiment, the acceptable range is indicated by an upper bound and a lower bound, with the set of values then being the sequence of values from (and/or including) the lower bound to (and/or including) the upper bound. The set of expected values represents the predicted behavior of the internal component (of interest) for the current block signature based on the previously captured behavior of the internal component.

In step 290, performance manager 150 checks whether an actual value for the processing metric at the first internal component in the current block duration is within the acceptable range to determine whether the operation of the software application is as expected. In particular, if the actual value is in the set of values indicated by the acceptable range, the operation of the software application is deemed to be as expected and not as expected (i.e. unexpected) otherwise. Control passes to step 299, where the flowchart ends.

It may be appreciated that the unexpected operation of the software application may indicate possible issues occurring during the processing of the current workload. The unexpected operation may be corrected by performing appropriate corrective actions such as increasing the resources required for execution of the (internal or other) components, recoding the software instructions of the components, regulating the workload (number of invocations/user requests), etc., to prevent such issues from occurring at a future time instance.

With respect to above noted example scenarios, performance manager 150 may use the component models to identify components having unexpected operation as potential bottlenecks, candidates having unwanted invocations, etc. and provide such information to developers/owners of the software application. Performance manager 150 may also generate corresponding component models for components of newer and older versions of a software application and then indicate the differences in operation of components during the processing of the same workloads by the newer and older versions of the software application.

Accordingly, performance manager 150 facilitates characterizing operation of a software application having a large number of components deployed in a computing infrastructure (130). The manner in which performance manager 150 provides several aspects of the present disclosure according to the steps of FIG. 2 is illustrated below with examples.

4. Illustrative Example

FIGS. 3A-3E, 4, 5, and 6A-6E together illustrate the manner in which characterizing operation of software applications having a large number of components is facilitated in one embodiment. Each of the Figures is described in detail below.

Figure 3A:
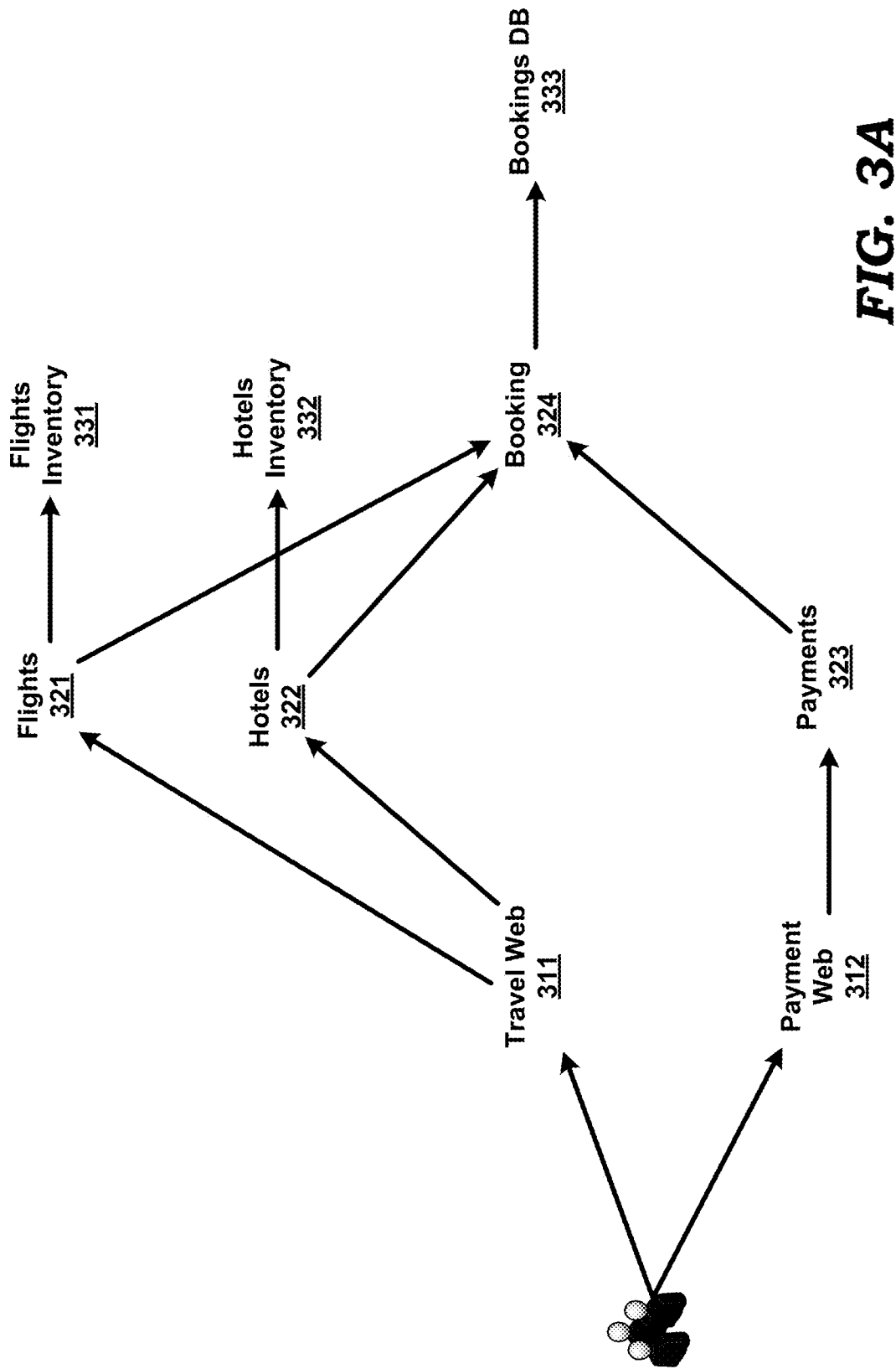
FIG. 3A depicts the details of a software application in one embodiment. For illustration, the software application is assumed to be an online travel application that enables users to search and book both flights and hotels.

FIG. 3A depicts the details of a software application in one embodiment. For illustration, the software application is assumed to be an online travel application that enables users to search and book both flights and hotels. The online travel application is shown containing various parts such as front-ends 311-312 (travel web and payment web respectively), backend services 321-324 (flights, hotels, payments and booking respectively) and data stores 331-333 (flights inventory, hotels inventory and bookings DB respectively).

Each of front-ends 311 and 312 is designed to process user requests received from external systems (such as end-user systems 110) connected to Internet 120 and send corresponding responses to the requests. For example, Travel Web 311 may receive (via path 121) user requests from a user using end-user system 110-2, process the received user requests by invoking one or more backend services (such as 321-323), and then send results of processing as corresponding responses to end-user systems 110-2. The responses may include appropriate user interfaces for display in the requesting end-user system (110-2). Payment Web 312 may similarly interact with end-user system 110-2 (or other end-user systems) and facilitate the user to make online payments.

Each of backend services 321-324 implements corresponding functionalities of the software application. Example of backend services are Flights service 331 providing the functionality of search of flights, Hotels service 322 providing the functionality of search of hotels, etc. A backend service (e.g. Flights service 321) may access/invoke other backend services (e.g. Booking service 324) and/or data stores (e.g. Flights Inventory 331) for providing the corresponding functionality.

Each of data stores 331-333 represents a storage component that maintains data used by other parts (e.g. services, front-ends) of the software application. As noted above, each of the data stores may be implemented as a database server or file system based on the implementation of the software application.

The manner in which the various parts of the software application (online travel application) are deployed in a computing infrastructure is described below with examples.

5. Deployment Scenarios

Figure 3B:
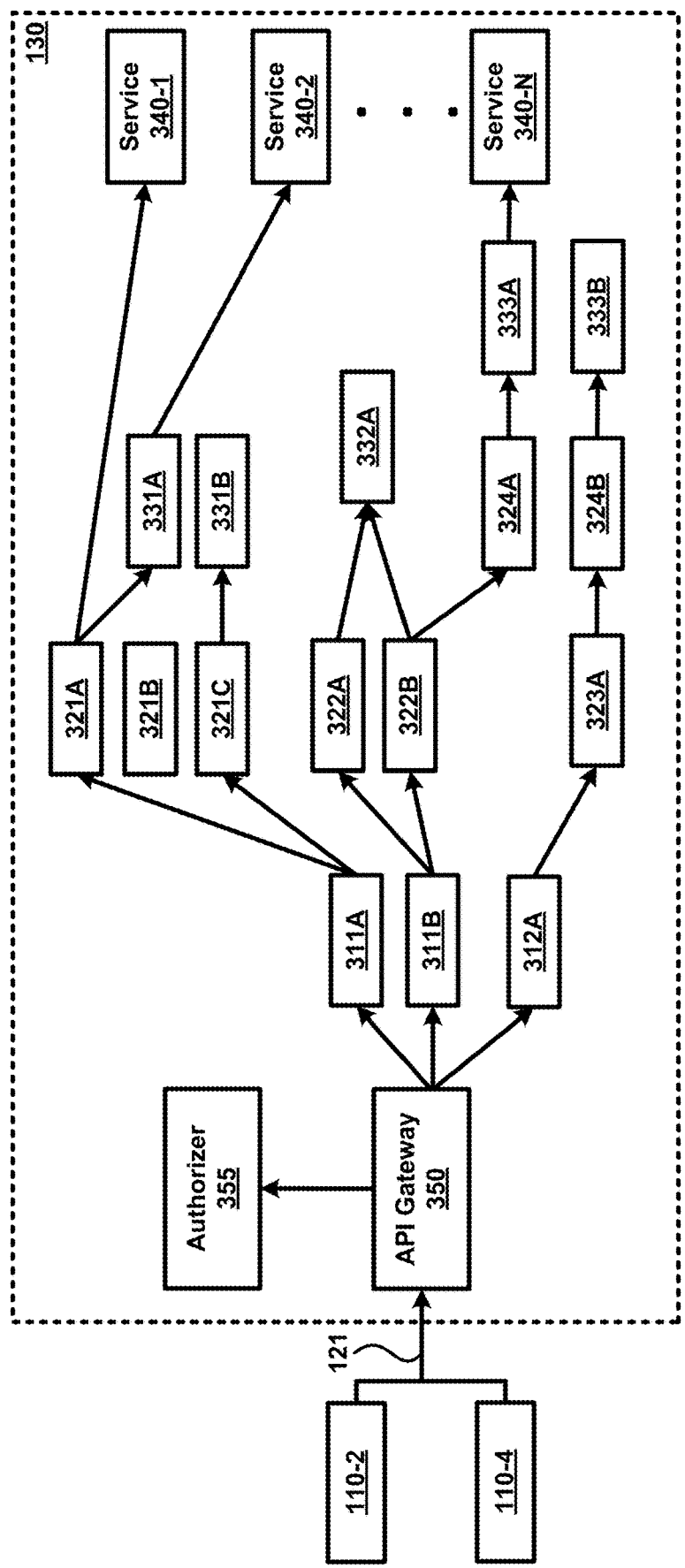
FIG. 3B depicts the manner in which a software application is deployed according to a serverless computing model in one embodiment.

FIG. 3B depicts the manner in which a software application is deployed according to a serverless computing model in one embodiment. In particular, the Figure depicts the manner in which the online travel application shown in FIG. 3A is deployed as a serverless application in a computing infrastructure (such as 130).

Serverless computing, as is well known, refers to a cloud-infrastructure based computing execution model in which the infrastructure provider manages the allocation of infrastructure resources (e.g., servers, CPU, memory, network addresses, etc.) for the software applications. As the software developer/owner is shielded from one or more of the responsibilities such as provisioning, scaling, capacity planning, maintenance, etc., the owner/developer is said to have a serverless view of the computing infrastructure. Examples of serverless computing include, but are not limited to, AWS Lambda available as part of AWS from Amazon, Google Cloud Functions available as part of Google Cloud Platform from Google, IBM Cloud Functions available as part of IBM Cloud from IBM, Azure Functions available as part of Microsoft Azure public cloud or on-premises via Microsoft Azure Stack.

In one embodiment, computing infrastructure 130 is a cloud infrastructure that offers a serverless computing model for deployment of software applications. In particular, the serverless computing model is a Function as a Service (Faas) platform, where the fundamental unit of deployment (and execution) is a compute function. As is well known, a compute function represents a named section of the software application that performs a specific task. The compute function has a well-defined set of inputs (none or many) and outputs (typically, none, one or many). The compute function is invoked by providing a corresponding value for each of the inputs (as part of a request to the function), with the compute function then generating a corresponding value for each of the outputs (as part of the response to the request).

As such, the software application is deployed as one or more compute functions (software components), with each function representing a section of the software application that provides a corresponding high-level functionality (e.g. Flights, Booking, etc.) of the software application. For illustration, it is assumed that each of the front-ends 311-312, backend services 321-324 and data stores 331-333 shown in FIG. 3A are deployed as corresponding compute functions/components in computing infrastructure 130, and as such the same number is used to represent the corresponding component. A software application deployed in the form of one or more compute functions is referred to as a serverless application.

Some of the components are shown having multiple instances (indicated by the suffix A, B, C, etc.), each instance representing a separate execution of the component. Such multiple instances may be necessitated for load balancing, throughput performance, etc. as is well known. For example, portal 311 is shown having two instances 311A and 311B deployed in computing infrastructure 130. Similarly, other components and corresponding instances are shown deployed in computing infrastructure 130. The compute functions are shown invoking other compute functions as indicated by the arrows in the Figure.

Services 340-1 to 340-N (N representing any natural number) are pre-defined/in-built services/functionalities provided by computing infrastructure 130 that may be invoked by the compute functions such as front-end functions (311A, 311B, etc.), backend service functions (321A, 322B, etc.) and/or data store functions (331A, 333B, etc.).

API (Application Program Interface) gateway 350 represents a point of entry (entry component) for the serverless application, and operates in association with authorizer 355 which is designed to verify end-user access to the deployed compute functions. During operation, API gateway 350 receives user requests from end-user systems (such as 110-2 and 110-4), determine whether the users sending the user requests are authorized to access the compute function (by interfacing with authorizer 355), and if authorized, invoke one or more compute functions deployed in computing infrastructure 130.

The description is continued with the manner in which various parts of the software application (online travel application) are deployed in a computing infrastructure in another example scenario.

Figure 3C:
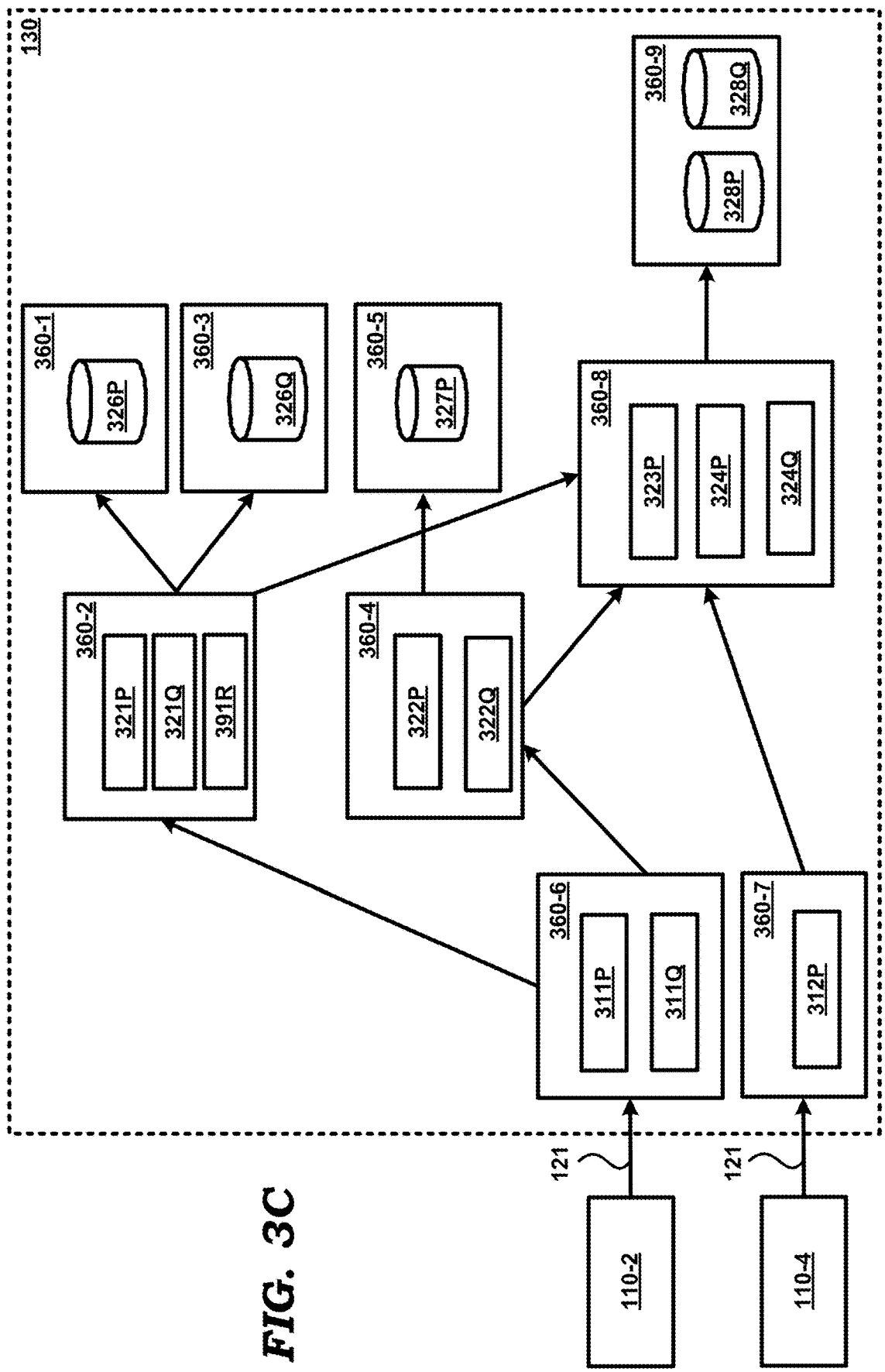
FIG. 3C depicts the manner in which a software application is deployed according to an enterprise computing model in one embodiment.

FIG. 3C depicts the manner in which a software application is deployed according to an enterprise computing model in one embodiment. In particular, the Figure depicts the manner in which the online travel application shown in FIG. 3A is deployed as an enterprise application in a computing infrastructure (such as 130).

Enterprise computing, as is well known, refers to an approach where software applications are developed and deployed as distinct modules (enterprise components), with each module having a specific mode of operation and implementing a corresponding functionality. For example, web portals are modules that interface with end-users (process user requests), application services are modules that operate in the backend and which are invoked by web portals for processing of the user requests, and data access interfaces are modules that enable the other modules (such as application services) to access data maintained in data stores. Examples of enterprise computing model include Java™ applications that are deployed for large enterprises.

As such, the software application is deployed as one or more modules (software components), with each module representing a section of the software application that provides a corresponding high-level functionality (e.g. Flights, Booking, etc.) of the software application. For illustration, it is assumed that front-ends 311-312 are implemented as corresponding web portals 311-312, backend services 321-324 are implemented as corresponding application services 321-324 and data stores 331-333 are implemented as corresponding data access interfaces 331-333. A software application deployed in the form of one or more enterprise modules is referred to as an enterprise application.

The modules/components may be deployed in a cloud infrastructure, an on-premises data center, or a combination of both (hybrid, as noted above). The description is continued assuming that the enterprise components are deployed in a cloud infrastructure (130)).

In one embodiment, virtual machines (VMs) form the basis for executing various software applications in processing nodes/server systems of computing/cloud infrastructure 130. As is well known, a virtual machine may be viewed as a container in which software applications (or components thereof) are executed. A processing node/server system can host multiple virtual machines, and the virtual machines provide a view of a complete machine (computer system) to the enterprise applications executing in the virtual machine.

VMs 350-1 to 350-9 represent virtual machines provisioned on nodes 160 of computing infrastructure 130. Each of the VM is shown executing one or more instances (indicated by the suffix P, Q, R, etc.) of web portals 311-312, application services 321-324 and/or data access interfaces 331-333. As noted above, such multiple instances may be necessitated for load balancing, throughput performance, etc. as is well known. For example, VM 350-6 is shown executing two instances 311P and 311Q of the "Travel Web" web portal. It should be appreciated that in such a deployment, any of the web portal instances may act as an entry component for the enterprise application.

Thus, a software application (online travel application) is deployed in a computing infrastructure (130). It may be desirable to characterize the operation of the software application, in particular, when having a large number of components (compute functions or modules). For example, while the serverless computing model provides various conveniences (e.g. relieving the developer of the burden of deployment) as noted above, one draw back of such a model is that the model may not provide visibility of usage of various infrastructure resources (e.g., servers, CPU, memory, network addresses, etc.) for processing of various user requests. Accordingly, challenges may be presented in performance management of software applications deployed using serverless computing models. In the case of enterprise computing model, it may be desirable to identify the transaction hotspots (modules that are being invoked/executed the most) in the software application.

It should be noted that only some sample deployment scenarios have been described here for illustration. The features of the present disclosure may be implemented in other deployment scenarios as well, such as an Enterprise Service Bus (ESB) based computing architectures (e.g. TIBCO EMS, MQ based Apps), as will be apparent to one skilled in the relevant arts by reading the disclosure herein. The operation of the software application (online travel application) is described below with examples.

6. Operation of Software Application

During operation of the online travel application, a user using end-user systems 110, may send various user requests for desired tasks such as searching for flights, selecting a flight (from a results of the search), booking a selected flight, etc. An entry component (such as API gateway 350 or web portals 311P/311Q) in the online travel application receives the user requests and causes various components of the software application to be invoked for processing of the received user requests. The manner in which the operation of the online travel application is characterized is described in detail below.

As the entire software application is sought to be characterized, it may be appreciated that the invocation types and corresponding invocation counts of an entry component correspond to the type and count of the received user requests, and as such the combination of invocation types and counts for a block duration represents the workload of the software application for that block duration.

According to an aspect, performance manager 150) first determines workload signatures based on the invocation types and corresponding invocation counts of an entry component. Performance manager 150 then generates the component model of an internal component correlating the values of the processing metric at the internal component to the determined workload signatures. Each workload signature represents a corresponding cluster of workloads (in respective block durations) which are deemed to be similar based on statistical and mathematical approaches.

In one embodiment, the workload of each block duration is represented as a block signature and is characterized by the invocation types initiated in the block duration. Specifically, each block signature and each workload signature indicate the respective invocation counts of the invocation types received in the corresponding block duration. The workload signature is then generated for a cluster of block signatures which are deemed to be statistically/mathematically similar.

Figure 4:
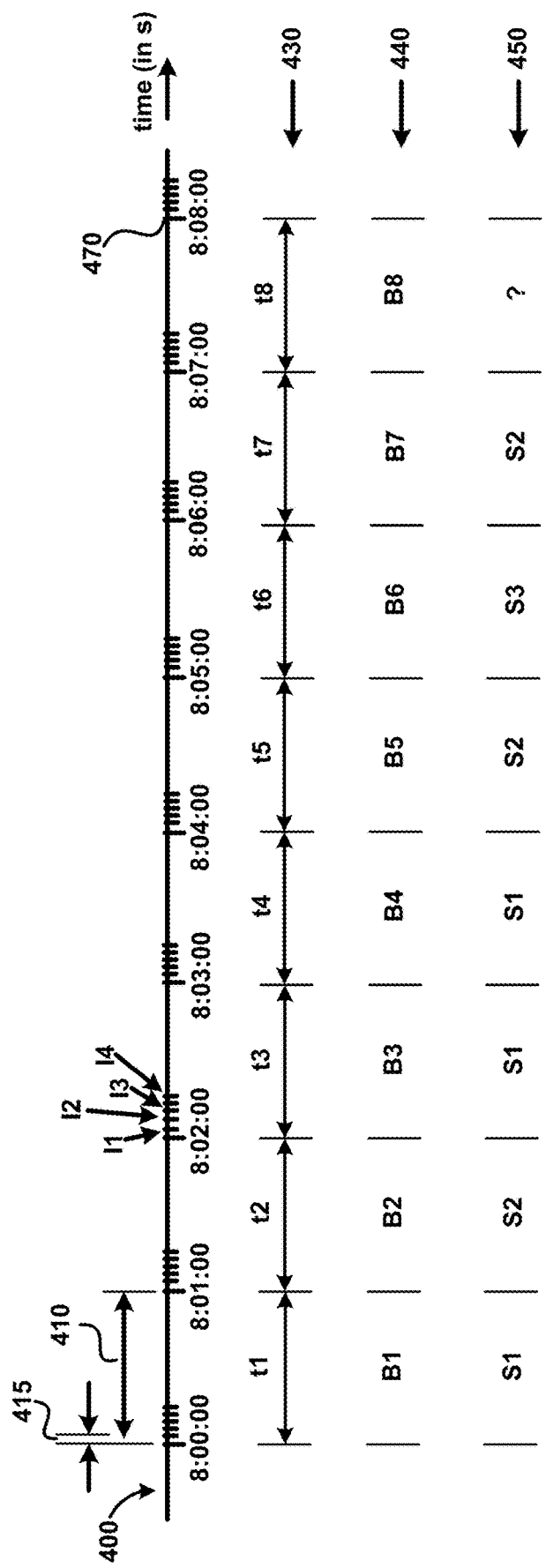
FIG. 4 depicts various timelines of operation of a software application in one embodiment.

FIG. 4 depicts various timelines of operation of a software application in one embodiment. Specifically, timeline 400 depicts the operation of a software application (e.g. online travel application) processing various user requests. For illustration, it is assumed that the user requests are received every second and accordingly timeline 400 is shown in seconds (as indicated by the 24-hour format "8:00:00"). As noted above, user requests cause invocations of an entry component (such as API gateway 350 or web portals 311P/311Q) of the software application.

Duration 415 represents the sub-block duration of one second, while duration 410 represents a block duration of one minute containing multiple (60) sub-block durations. Timeline 400 is shown having 8 block durations (t1 to t8) as indicated by 430. I1, I2, I3 and I4 indicate invocations (of corresponding invocation types) of an entry component during the block duration t3. Similarly, other transaction instances are received during the other block durations.

B1 to B8 represent the block signatures determined respectively for the block duration t1 to t8 as indicated by 440. As noted above, each block signature indicates a corresponding number of occurrences of invocation counts of each invocation type in the corresponding block duration. Thus, the block signature B3 may be determined based on the count and type of the invocations I1, I2, I3, and I4 received in block duration t3.

At time instance 470 (8:08:00), block durations t1 to t7 represent a prior set of block signatures based on which workload signatures may be identified and component models are formed. As noted above, the workload signatures are identified for a cluster of block signatures which are deemed to be statistically/mathematically similar. For example, the set of block signatures {B1, B3, B4, B8} may be determined to be similar and accordingly clustered together as a single workload signature S1. 450 indicates the workload signatures determined for each of the block durations t1 to t7. It may be readily observed that workload signatures S2 and S3 represent the cluster of block signatures {B2, B5, B7} and {B6} respectively.

At time instance 470 (8:08:00), performance manager 150 also has collected the invocation details for a current block duration (B8) from 8:07:00 and 8:08:00, determined the current block signature B8, predicted an acceptable range for an internal component based on the corresponding component model and the collected invocation details and checked whether the actual values for the processing metric at the internal component in the current block duration (B8) is within the predicted acceptable range according to aspects of the present disclosure.

The description is continued with the manner in which the invocation of components of a software application is modelled according to aspects of the present disclosure.

Figure 5B:
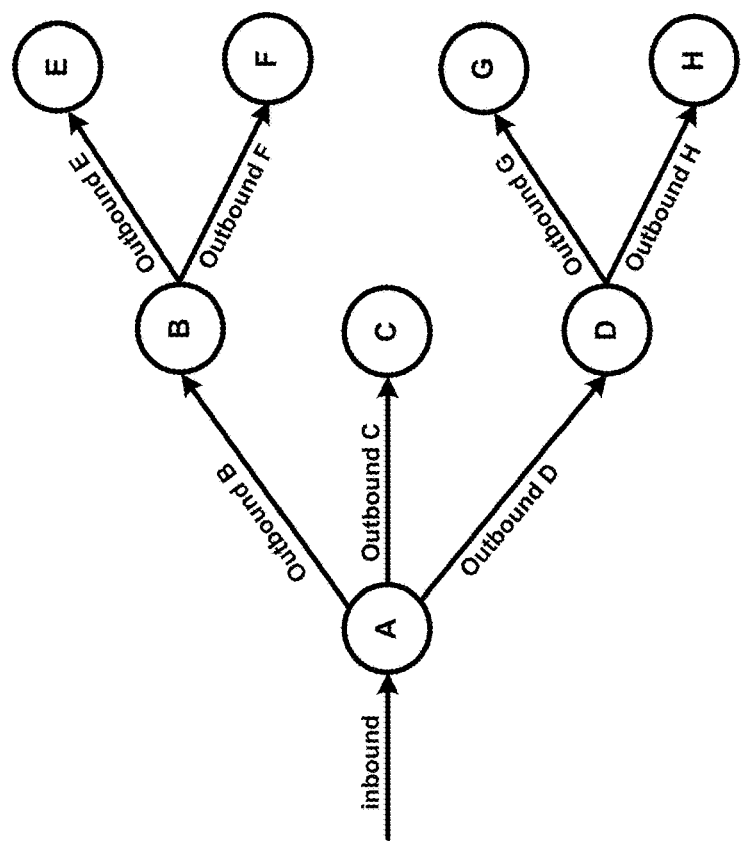
FIGS. 5A and 5B depict the manner in which invocations of components of a software application are modelled in one embodiment.
Figure 5A:
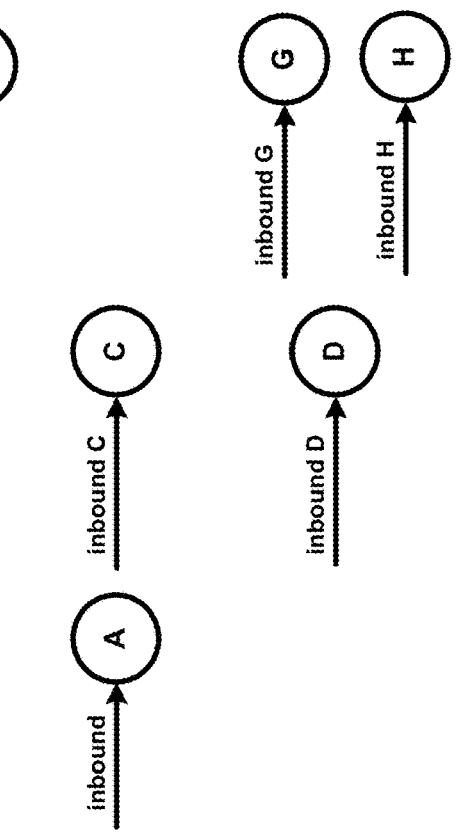

FIGS. 5A and 5B depict the manner in which invocations of components of a software application are modelled in one embodiment. While FIG. 5A depicts the modelling when the topology/execution flow is unknown, FIG. 5B depicts the modelling when the topology/execution flow is known. As is well known, the topology/execution flow specifies the sequence of execution of components, each link of the execution flow specifying an invoking component that invokes an invoked component.

Each of nodes A. B. C, etc. represent a component of the software application such as one of instances of 311-312, 321-324 and 331-333 in FIGS. 3B and 3D. Node A represents an entry component, that is the single component through which all the requests constituting the work load are received for processing by the portion of software application sought to be characterized. As noted above, when the entire software application is sought to be characterized node A is the component (such as API gateway 350 or web portals 311P/311Q) that receives user requests from end-user systems 110. Nodes B, C, etc. represent internal components that are caused to be executed (either directly or indirectly) by the entry component. In the following description, labels A, B, C, etc. are used interchangeably for the nodes as well the respective components represented by the nodes.

The text "Inbound" for node A indicates the workload (user requests) of the entry component, while the texts "Inbound X" and "Outbound X" (X being any of nodes B, C, etc.) respectively indicate the inbound and outbound invocation rates (that is the invocation counts of corresponding invocation types in corresponding periods) of the corresponding internal component. The inbound/outbound invocation rates represent the processing metric measured at the various internal components.

Referring to FIG. 5A, the entry component (node A) is shown receiving a workload and causing execution of internal components (nodes B to H). However, as the topology/execution flow is unknown, the internal components are shown separated from the entry component. In such a scenario, performance manager 150 determines the specific internal component (e.g. node H) which may have a potential issue when the actual value of the inbound invocation rate at the specific internal component is outside the acceptable range.

Referring to FIG. 5B, the entry component (node A) is shown receiving a workload and causing execution of internal components (nodes B to H) according to the known topology/execution flow: The internal components are shown inter-linked, with each link specifying an invoking component (e.g. node D) that invokes an invoked component (e.g. node H). In such a scenario, when the actual value of the inbound invocation rate at a specific internal component (e.g. node H) is outside the acceptable range, performance manager 150) then checks whether an invoking component (node D) has an actual value of the inbound invocation rate within a corresponding acceptable range.

Performance manager 150 may continue to check for prior invoking components (move towards the left in the model of FIG. 5B) until a root cause component (e.g. node A) in the execution flow is identified. It may be readily appreciated that the unexpected operation of the root cause component (node A) may be the primary reason for the unexpected behavior of the subsequently invoked internal components (nodes D and H).

In one embodiment, before checking for prior invoking components, performance manager 150 checks whether the invoking component (e.g. node D) is operating in an expected manner. For example, performance manager 150 may check whether the actual usage of CPU, memory, etc. in the invoking component (node D) is within a predicted range of values. The predicted range of values may be determined using the techniques described in US Patent entitled. "Proactive Information Technology Infrastructure Management". U.S. Pat. No. 8,903,757 B2, naming as inventor Desikachari. and Applicant as "Appnomic Systems Private Limited". In the scenario, that the actual usage is determined to be outside the predicted range of values, the invoking component (node D) is identified as the root cause component (for the unexpected behviour).

The description is continued with an example implementation of performance manager 150 provided according to several aspects of the present disclosure.

7. Sample Implementation

Figure 6:
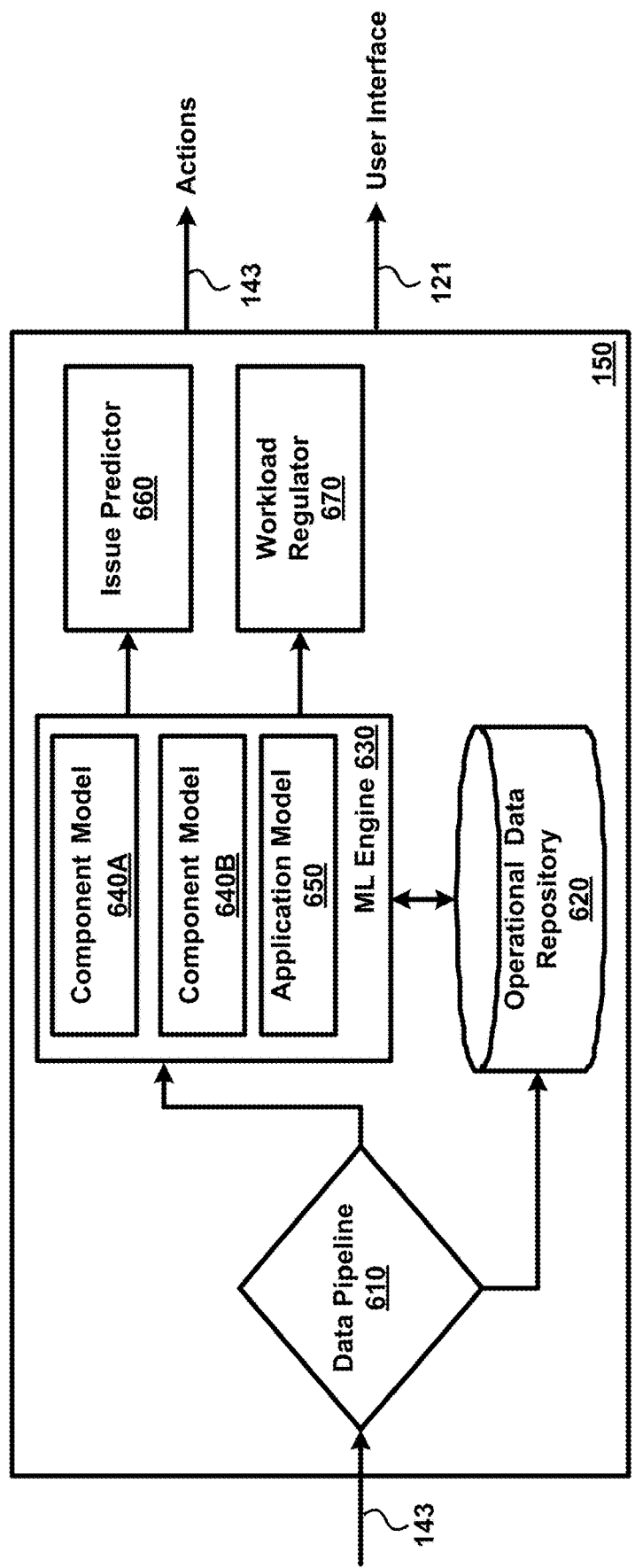
FIG. 6 is a block diagram depicting an example implementation of a performance manager (150) in one embodiment.

FIG. 6 is a block diagram depicting an example implementation of a performance manager (150)) in one embodiment. The block diagram is shown containing data pipeline 610, operational data repository (ODR) 620 and ML engine 630 (in turn, shown containing component models 640A-640B and application model 650), issue predictor 660 and workload regulator 470). Each of the blocks is described in detail below.

Data pipeline 610 receives the details of the user requests received by the software application (e.g. via path 143) and determines the workload corresponding to each block duration. In the following description, it is assumed that the invocation types and corresponding invocation counts at an entry component (first data) and the values of a processing metric at internal components (second data) are received from computing infrastructure 130. For example, computing infrastructure 130 may maintain operational parameters (e.g. bytes sent/received by each component, an invocation count of each component, request/response times, etc.) related to the components of the software application, and accordingly may provide the first data and second data in response to corresponding requests received from performance manager 150.

Alternatively, each component of the software application may be instrumented with additional software instructions/code that monitors the various operational parameters noted above and provides the invocation types and corresponding invocation counts for the component. Example portions of first data and second data are shown in FIGS. 7A and 7B, described in detail below:

In one embodiment, data pipeline 610 generates a block signature for the corresponding block duration. In particular, the block signature indicates the invocation count of each invocation type in the corresponding block duration. Data pipeline 410 then identifies a workload signature representing a cluster of block signatures (in respective block durations) which are deemed to be similar based on statistical and mathematical approaches. In general, when clustering block signatures logged over a long duration (e.g., a week while block duration is a minute), fewer clusters would be realized and potentially resources used sub-optimally if a coarser parameters (distances) are chosen for clustering. On the other hand, choosing finer parameters would result in closer to optimal resource usage, but would result in more clusters.

A balance may accordingly be realized by choosing appropriate parameters for clustering. Well-known clustering techniques such as partitioning methods, hierarchical clustering, fuzzy clustering, density-based clustering and model-based clustering may be used to identify a workload signature. Example workload signatures determined based on the first data are shown in FIG. 7C, described in detail below.

Data pipeline 610 also receives the values for the processing metric at the internal components of the software application (e.g. online travel application) deployed in computing infrastructure 130. Data pipeline 610 then stores the generated workload signatures and the received values at the internal components in ODR 620. ODR 620 represents a data store that maintains portions of operation data. Though shown internal to performance manager 150, in alternative embodiments, ODR 620 may be implemented external to performance manager 150, for example, in one or more of nodes 160. Data pipeline 610 also forwards the workload signatures and the values for processing metric to ML engine 630.

ML engine 630) generates various models that correlate the data received from data pipeline 610. The models may be generated using any machine learning approach such as KNN (K Nearest Neighbor), Decision Tree, etc. Various other machine learning approaches can be employed, as will be apparent to skilled practitioners, by reading the disclosure provided herein. In an embodiment, supervised machine learning approaches are used.

Component models 640A-640B represent ML based models generated for corresponding internal components. Each component model correlates the values for the processing metric at the corresponding internal component with the workload signatures. In one embodiment, application model 650 that correlates the values for the processing metric at all internal components with the workload signatures is also generated.

Figure 7E:
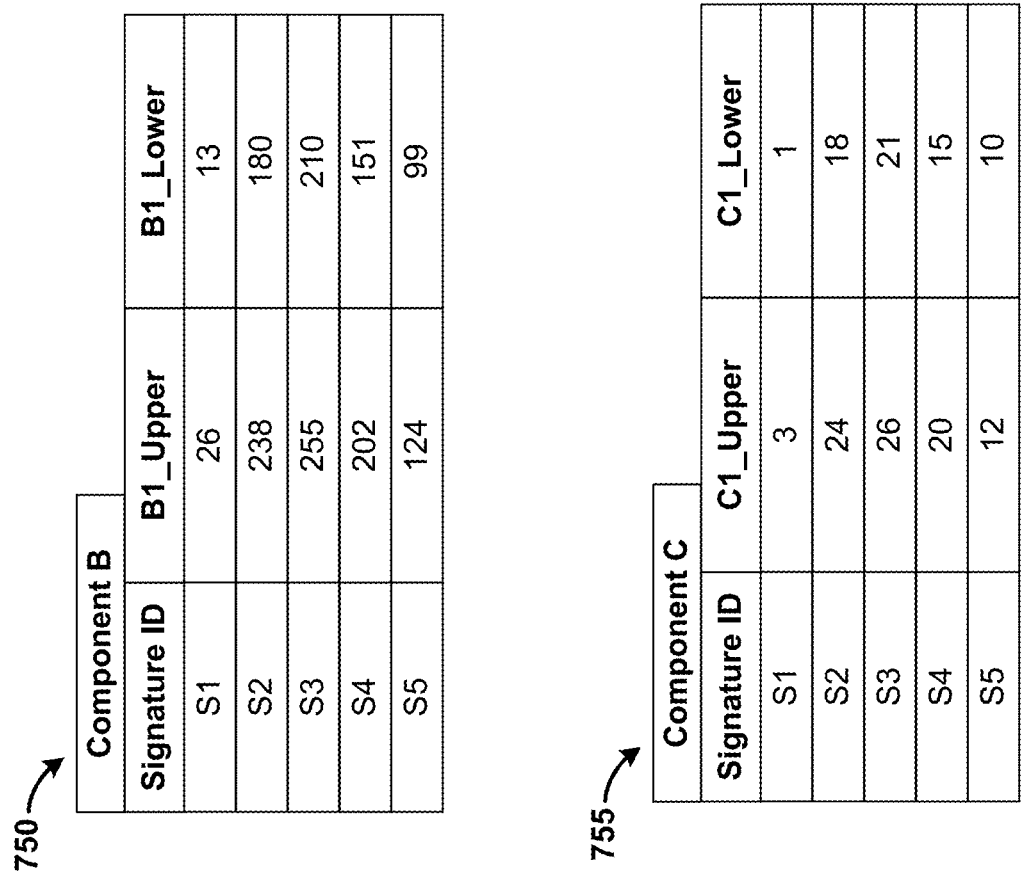
FIG. 7E is range tables depicting the acceptable ranges predicted at internal components of a software application in a current block duration, in one embodiment.

Some general concepts to generating a component model in an embodiment is described in US Patent entitled, "Proactive Information Technology Infrastructure Management", U.S. Pat. No. 8,903,757 B2, naming as inventor Desikachari, and Applicant as "Appnomic Systems Private Limited". Components models 640A-640B are used to predict the acceptable range for the processing metric at the corresponding internal component. Example predicted ranges are shown in FIG. 7E, described in detail below.

Issue predictor 660 generates notifications regarding anomalies (indicative of future issues) detected based on component models 640A-640B (or application model 650). The notifications may be sent to a user using end use system 110 (e.g. via path 121) and/or used as the basis for performing suitable actions for fixing the detected anomalies (e.g. via path 143). It may be appreciated that by detecting anomalies early and performing the corrective actions the occurrence of probable future issues may be prevented.

Workload regulator 670 controls the number of user requests (workload) received by the software application based on component models 640A-640B (or application model 650). Such workload regulation may prevent issues from occurring at a future time instance. One example of regulation is workload throttling which entails reducing the number of user requests (e.g. via path 121), and correspondingly the number of invocations of the entry component. For example, when a user is performing an interaction (such as "Search Flight"), the user may be shown a notification of the overload of the application and asked to wait for a short duration (e.g. 10) seconds) prior to initiating the transaction (e.g. clicking a "Submit" button).

It may be appreciated that by detecting anomalies early and performing the appropriate (corrective) actions the occurrence of probable future issues may be prevented. For example, by handling unexpected workload surges, future issues such as unacceptably large response times, the software application becoming inoperable, etc. may be prevented. The description is continued with sample data that may be maintained in ODR 620 followed by the real-time operation of performance manager 150.

8. Sample Data

FIGS. 7A through 7F depicts sample data used in the handling of workload surges in a software application supporting multi-stage journeys in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein.

FIG. 7A is a workload table depicting the invocation types and corresponding invocation counts of an entry component (A) of a software application in multiple block durations, in one embodiment. In workload table 710, the columns indicate the invocation types (A1_Inbound, A2_Inbound, etc.) while the rows indicate the block durations of one minute each. Each cell (at the intersection of a row and a column) thus indicates the invocation count for the corresponding invocation type in respective block duration. For example, workload table 710 indicates that the invocation count for the invocation type "A1_Incoming" in the block duration "1/25/2020 0:08" (that is from "0:07" to "0:08") is 10.

FIG. 7B is metric tables depicting the values of a processing metric captured at internal components of a software application in multiple block durations, in one embodiment. As the processing metric is the invocation counts of corresponding invocation types at an internal component, the rows, columns and cells of metric tables 720, 725 and 728 convey the same information as those of workload table 710. In particular, metric tables 720, 725 and 728 specify the values at the internal components B, C and D respectively.

FIG. 7C is a signature table depicting the work load signatures identified for a software application in one embodiment. In signature table 730, the columns indicate the different invocation types, while each row indicates a corresponding workload signature (S1, S2, S3, etc.). Each cell indicates a corresponding invocation count of the invocation type (indicated by the column) in the respective signature.

FIG. 7D is a topological table depicting the execution flow for a software application in one embodiment. In topological table 740, each row specifies the details of a link/invocation in the execution flow, with columns "Invoking" and "Invoked" respectively indicates the identifiers of the invoking and invoked components, while column "Invocation ID" indicates the invocation type corresponding to the invocation.

FIG. 7E is range tables depicting the acceptable ranges predicted at internal components of a software application in a current block duration, in one embodiment. In range table 750, columns "B1_Upper" and "B1_Lower" respectively specify the upper and lower bounds for the invocation count of the invocation type B1_Inbound (processing metric) at internal component B for different workload signatures (S1 to S5). Similarly, range table 755 specifies the upper and lower bounds for the invocation count of the invocation type C1_Inbound at internal component C for the different workload signatures.

FIG. 7F is a run-time table depicting characterizing operation of an internal component (B) of a software application in multiple block durations, in one embodiment. In run-time table 760, the rows represent the workloads processed by a software application during multiple block durations. Each row may be viewed as a current block duration at the time of processing. Columns "A1_Inbound", "A2_Inbound", and "A3_Inbound" indicate the invocation counts of respective invocation types at an entry component (A). Column "Signature" indicates a workload signature identified based the invocation counts in columns "A1_Inbound", "A2_Inbound", and "A3_Inbound". A blank (space) in the "Signature" column indicates that no prior workload signature could be identified (for example, in row 765).

Column "B1_Inbound" indicates the measured invocation count of an invocation type (B1_Inbound) at an internal component (B). The measured invocation count represents the actual value for the processing metric. Columns "B1_Upper" and "B1_Lower" respectively specify the upper and lower bounds for the invocation count of the invocation type B1 Inbound for the identified workload signature in column "Signature". Column "Is Anomalous" indicates whether the actual value (column "B1_Inbound") is within (blank/space) or outside (value "1") the acceptable range (as indicated by columns B1_Upper" and "B1_Lower").

Thus, performance manager 150) maintains various data required for characterizing operation of software application having a large number of components. The manner in which performance manager 150 uses the data to provide several aspects of the present disclosure is described below with examples.

9. Real-Time Operation

During real-time operation, performance manager 150 receives operational data similar to that shown in columns "A1_Inbound", "A2_Inbound", and "A3_Inbound" of run-time table 760 for a current block duration (one row in table 760) and then generates a current block signature for the current block duration. In particular, the invocation counts in these three columns together form a current block signature for each current block duration.

Performance manager 150 then checks whether the current block signature matches a workload signature previously determined and stored in signature table 730. The match may be determined in any convenient manner, for example, based on root mean square error, well known in the relevant arts. Broadly, a match is deemed to be found if the invocation counts in columns "A1_Inbound", "A2_Inbound", and "A3_Inbound" of run-time table 760 is close to the invocation counts in any of the rows of signature table 730.

If no match is found (e.g. as indicated by row 765), performance manager 150 may handle the unknown signature using the techniques described in co-pending US Patent Application entitled, "Handling of Workload Surges in a Software Application", application Ser. No. 16/792,914, naming as inventor Desikachari, and Applicant as "Appnomic Systems Private Limited". The description is continued assuming that performance manager 150 has determined a match for each of the block signatures B1 and B8 in the timeline 400 of FIG. 4.

If a match is found, performance manager 150 then identifies an internal component of interest, such as B, whose operation is sought to be checked. Performance manager 150 accordingly retries/receives operational data shown in column "B1_Inbound" of run-time table 760 for the current block duration. Performance manager 150 also determines the upper and lower bound values (acceptable range) based on the identified workload signature and range table 750.

Performance manager 150) then checks whether the actual value in column "B1_Inbound" of run-time table 760 is within the acceptable range. In one embodiment, performance manager 150 deems the actual value to be within the acceptable range if the actual value is greater than (or equal to) the lower bound and is less than (or equal to) the upper bound and to be outside the acceptable range otherwise. Performance manager 150 then updates column "Is Anomalous" with the value "1" only if the actual value is outside the acceptable range.

In the scenario that topological table 740 is available, performance manager 150 identifies an invoking component for the internal component of interest (B). Performance manager 150 then performs the above described processing for the invoking component as well. As noted above, performance manager 150 continue to check for prior invoking components to identify the root cause component in the execution flow.

It may be appreciated that though described above with respect to one internal component (B), performance manager 150 may perform similar processing for other internal components of interest (such as C, D, etc.). In an alternative embodiment, performance manager 150 performs the above described processing for all internal components of the software application.

It should be further appreciated that the features described above can be implemented in various embodiments as a desired combination of one or more of hardware, software, and firmware. The description is continued with respect to an embodiment in which various features are operative when the software instructions described above are executed.

11. Digital Processing System

Figure 8:
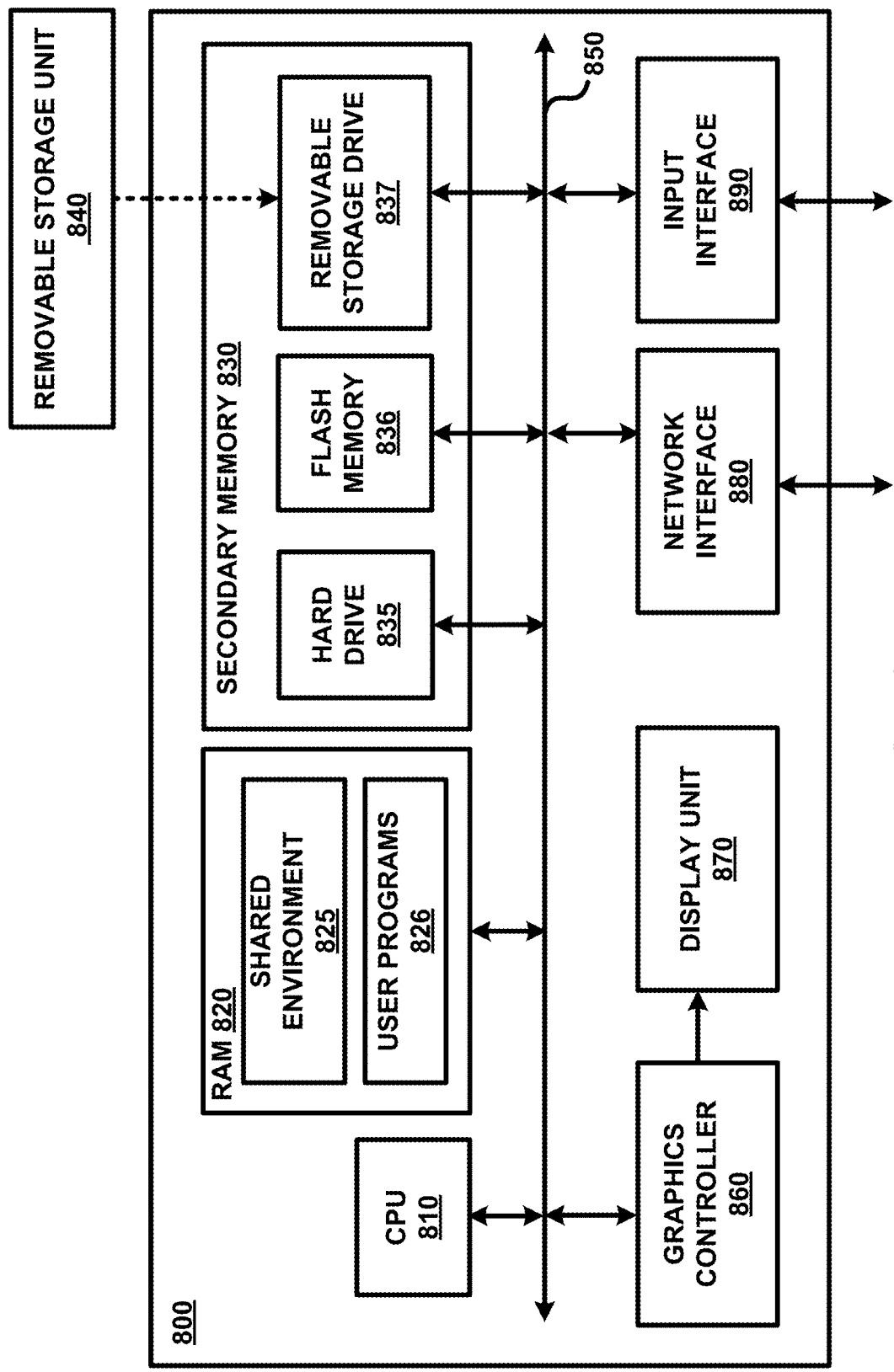
FIG. 8 is a block diagram illustrating the details of digital processing system 800 in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to performance manager 150 (or any system implementing performance manager 150).

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems connected to the networks.

Secondary memory 830 may contain hard drive 835, flash memory 836, and removable storage drive 837. Secondary memory 830 may store the data (e.g. data portions of FIGS. 7A-7F) and software instructions (e.g. for implementing the steps of FIG. 2 and blocks of FIG. 6), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840), and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840) includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

12. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for characterizing operation of a serverless software application comprising a plurality of components deployed on a plurality of nodes in a computing infrastructure, wherein said plurality of components comprise an entry component deployed on a first node and internal components deployed on other nodes of said plurality of nodes, wherein said entry component is designed to receive user requests and thereafter cause execution of one or more of said internal components for processing each user request, wherein execution of the one or more instructions by one or more processors contained in a digital processing system causes the digital processing system to perform the actions of:

receiving a plurality of user requests at the entry component;

forwarding, by the entry component, the plurality of user requests to said internal components of the software application in a plurality of block durations in which the user requests are processed by said internal components;

receiving, by a data pipeline module, a first data indicating invocation types and corresponding invocation counts at only said entry component in the plurality of block durations in which said user requests are processed by said software application, wherein each invocation type is associated with a respective invocation count that comprises a number of times an associated invocation type is executed by a respective internal component;

receiving, by said data pipeline module, a second data indicating values for a processing metric at said internal components for said plurality of block durations, wherein said processing metric at each internal component of said internal components comprise invocation counts of corresponding invocation types of each of the said internal components;

constructing, by a machine learning (ML) engine, for each internal component of said internal components, a corresponding component model correlating the values for said processing metric at said internal component indicated in said second data to the invocation types and invocation counts of only said entry component indicated in said first data;

after said constructing, performing the following actions for each block duration in the plurality of block durations:

identifying, by said data pipeline module, after said constructing, a third data indicating a first set of invocation types and corresponding first invocation counts at said entry component in a current block duration during operation of said software application;

for each internal component in the said internal components:

predicting, by the issue predictor, an acceptable range for the processing metric at a respective internal component in the current block duration based on a component model associated with the respective internal component and the third data, wherein the acceptable range comprises a set of values expected for the processing metric;

detecting, by an issue predictor, anomalies in the respective internal component based on the predicted acceptable range for said processing metric and said determined processing metric in said current block duration, wherein an anomaly is detected when said actual processing metric is outside of the predicted acceptable range; and performing, by a workload regulator module, corrective actions to fix said detected anomalies, thereby preventing potential future issues with said internal components.

2. The non-transitory machine-readable medium of claim 1, wherein said constructing constructs a first component model for a first internal component, wherein said applying comprises predicting based on said first component model and said third data, an acceptable range for said processing metric at said first internal component in said current block duration; and wherein said detecting comprises checking whether an actual value for said processing metric at said first internal component in said current block duration is within said acceptable range to determine whether the operation of said software application is as expected or is an anomaly of said anomalies.

3. The non-transitory machine-readable medium of claim 2, wherein said constructing comprises one or more instructions for:

determining a plurality of workload signatures based on said first data, wherein each workload signature represents a cluster of block signatures, wherein each block signature characterizes the invocation types and respective invocation counts in a corresponding block duration; and generating said first component model correlating the values of said processing metric at said first internal component to said plurality of workload signatures.

4. The non-transitory machine-readable medium of claim 3, wherein said first component model is a machine learning (ML) model.

5. The non-transitory machine-readable medium of claim 4, wherein said plurality of components includes an API (application program interface) gateway, compute functions, and services, wherein said entry component is said API gateway that receives user requests and invokes at least some of the other components of said plurality of components to process the user requests.

6. The non-transitory machine-readable medium of claim 4, wherein said software application is an enterprise application, wherein said plurality of components includes web portals, application services, and data access interfaces, wherein said entry component is a web portal that receives user requests and invokes at least some of the other components of said plurality of components to process the user requests.

7. The non-transitory machine-readable medium of claim 2, wherein said constructing constructs a second component model for a second internal component, wherein said predicting predicts based on said second component model and said third data, a second acceptable range for said processing metric at a second internal component in said current block duration, further comprising one or more instructions for:

receiving a topology data indicating an execution flow in said software application, each link of said execution flow specifying an invoking component that invokes an invoked component, wherein a first link specifies that said second internal component invokes said first internal component; and if said checking determines that said actual value for said processing metric at said first internal component is outside said acceptable range, checking whether an actual value of said processing metric at said second internal component in said current block duration is within said second acceptable range in view of said first link to determine whether the operation of said software application is as expected.

8. A method for characterizing operation of a serverless software application comprising a plurality of components deployed on a plurality of nodes in a computing infrastructure, wherein said plurality of components comprise an entry component deployed on a first node and internal components deployed on other nodes of said plurality of nodes, wherein said entry component is designed to receive user requests and thereafter cause execution of one or more of said internal components for processing each user request, the method comprising:

receiving a plurality of user requests at the entry component;

forwarding, by the entry component, the plurality of user requests to said internal components of the software application in a plurality of block durations in which the user requests are processed by said internal components;

receiving, by a data pipeline module, a first data indicating invocation types and corresponding invocation counts at only said entry component in the plurality of block durations in which said user requests are processed by said software application, wherein each invocation type is associated with a respective invocation count that comprises a number of times an associated invocation type is executed by a respective internal component;

receiving, by said data pipeline module, a second data indicating values for a processing metric at said internal components for said plurality of block durations, wherein said processing metric at each internal component of said internal components comprise invocation counts of corresponding invocation types of each of the said internal components;

constructing, by a machine learning (ML) engine, for each internal component of said internal components, a corresponding component model correlating the values for said processing metric at said internal component indicated in said second data to the invocation types and invocation counts of only said entry component indicated in said first data;

after said constructing, performing the following actions for each block duration in the plurality of block durations:

identifying, by said data pipeline module, after said constructing, a third data indicating a first set of invocation types and corresponding first invocation counts at only said entry component in a current block duration during operation of said software application;

for each internal component in the said internal components:

predicting, by the issue predictor, an acceptable range for the processing metric at a respective internal component in the current block duration based on a component model associated with the respective internal component and the third data, wherein the acceptable range comprises a set of values expected for the processing metric;

detecting, by an issue predictor, anomalies in the respective internal component based on the predicted acceptable range for said processing metric and said determined processing metric in said current block duration, wherein an anomaly is detected when said actual processing metric is outside of the predicted acceptable range; and performing, by a workload regulator module, corrective actions to fix said detected anomalies, thereby preventing potential future issues with said internal components.

9. The method of claim 8, wherein said constructing constructs a first component model for a first internal component, wherein said applying comprises predicting based on said first component model and said third data, an acceptable range for said processing metric at said first internal component in said current block duration; and wherein said detecting comprises checking whether an actual value for said processing metric at said first internal component in said current block duration is within said acceptable range to determine whether the operation of said software application is as expected or is an anomaly of said anomalies.

10. The method of claim 9, wherein said constructing comprises:

determining a plurality of workload signatures based on said first data, wherein each workload signature represents a cluster of block signatures, wherein each block signature characterizes the invocation types and respective invocation counts in a corresponding block duration; and generating said first component model correlating the values of said processing metric at said first internal component to said plurality of workload signatures.

11. The method of claim 10, wherein said first component model is a machine learning (ML) model.

12. The method of claim 9, wherein said constructing constructs a second component model for a second internal component, wherein said predicting predicts based on said second component model and said third data, a second acceptable range for said processing metric at a second internal component in said current block duration, said method further comprising:

receiving a topology data indicating an execution flow in said software application, each link of said execution flow specifying an invoking component that invokes an invoked component, wherein a first link specifies that said second internal component invokes said first internal component; and if said checking determines that said actual value for said processing metric at said first internal component is outside said acceptable range, checking whether an actual value of said processing metric at said second internal component in said current block duration is within said second acceptable range in view of said first link to determine whether the operation of said software application is as expected.

13. A digital processing system for characterizing operation of a serverless software application comprising a plurality of components deployed on a plurality of nodes in a computing infrastructure, wherein said plurality of components comprise an entry component deployed on a first node and internal components deployed on other nodes of said plurality of nodes, wherein said entry component is designed to receive user requests and thereafter cause execution of one or more of said internal components for processing each user request, the digital processing system comprising:

a random access memory (RAM) to store instructions; and one or more processors to retrieve and execute the instructions, wherein execution of the instructions causes the digital processing system to perform the actions of:

receiving a plurality of user requests at the entry component;

forwarding, by the entry component, the plurality of user requests to said internal components of the software application in a plurality of block durations in which the user requests are processed by said internal components;

receiving, by a data pipeline module, a first data indicating invocation types and corresponding invocation counts at only said entry component in the plurality of block durations in which said user requests are processed by said software application, wherein each invocation type is associated with a respective invocation count that comprises a number of times an associated invocation type is executed by a respective internal component;

receiving, by said data pipeline module, a second data indicating values for a processing metric at said internal components for said plurality of block durations, wherein said processing metric at each internal component of said internal components comprise invocation counts of corresponding invocation types of each of the said internal components;

constructing, by a machine learning (ML) engine, for each internal component of said internal components, a corresponding component model correlating the values for said processing metric at said internal component indicated in said second data to the invocation types and invocation counts of only said entry component indicated in said first data;

after said constructing, performing the following actions for each block duration in the plurality of block durations:

identifying, by said data pipeline module, after said constructing, a third data indicating a first set of invocation types and corresponding first invocation counts at said entry component in a current block duration during operation of said software application;

detecting, by an issue predictor, anomalies in the respective internal component based on the predicted acceptable range for said processing metric and said determined processing metric in said current block duration, wherein an anomaly is detected when said actual processing metric is outside of the predicted acceptable range; and performing, by a workload regulator module, corrective actions to fix said detected anomalies, thereby preventing potential future issues with said internal components.

14. The digital processing system of claim 13, wherein said digital processing system constructs a first component model for a first internal component, wherein said applying comprises predicting based on said first component model and said third data, an acceptable range for said processing metric at said first internal component in said current block duration; and wherein said detecting comprises checking whether an actual value for said processing metric at said first internal component in said current block duration is within said acceptable range to determine whether the operation of said software application is as expected or is an anomaly of said anomalies.

15. The method of claim 14, wherein for said constructing, said digital processing system performs the actions of:

determining a plurality of workload signatures based on said first data, wherein each workload signature represents a cluster of block signatures, wherein each block signature characterizes the invocation types and respective invocation counts in a corresponding block duration; and generating said first component model correlating the values of said processing metric at said first internal component to said plurality of workload signatures.

16. The method of claim 15, wherein said first component model is a machine learning (ML) model.

17. The method of claim 14, wherein said digital processing system constructs a second component model for a second internal component and predicts based on said second component model and said third data, a second acceptable range for said processing metric at a second internal component in said current block duration, said digital processing system further performing the actions of:

receiving a topology data indicating an execution flow in said software application, each link of said execution flow specifying an invoking component that invokes an invoked component, wherein a first link specifies that said second internal component invokes said first internal component; and if said checking determines that said actual value for said processing metric at said first internal component is outside said acceptable range, checking whether an actual value of said processing metric at said second internal component in said current block duration is within said second acceptable range in view of said first link to determine whether the operation of said software application is as expected.

\* \* \* \* \*